US005616356A

United States Patent [19]

Buhler et al.

[11] Patent Number: 5,616,356

[45] Date of Patent: Apr. 1, 1997

[54] PROCESS FOR MILLING, DEHYDRATING AND DEODORIZING PLANT FIBER RESIDUES

[75] Inventors: Marcel Buhler, Tolochenaz; Thang Ho Dac, Le Mont S/Lausanne; Ulrich Zurcher, Yverdon, all of Switzerland

[73] Assignee: Nestec S.A., Vevey, Switzerland

[21] Appl. No.: 563,946

[22] Filed: Nov. 29, 1995

[30] Foreign Application Priority Data

Dec. 21, 1994 [EP] European Pat. Off. .............. 94810743

[51] Int. Cl.[6] .............................. A23L 1/015

[52] U.S. Cl. .............. 426/443; 426/473; 426/452; 426/486; 426/518; 426/523; 241/23

[58] Field of Search .............. 426/443, 473, 426/518, 486, 452, 523; 241/23, 27

[56] References Cited

U.S. PATENT DOCUMENTS

| | | | |
|---|---|---|---|
| 3,241,587 | 3/1966 | Steele | 241/27 |
| 3,983,261 | 9/1976 | Mendoza | 426/473 |
| 4,181,534 | 1/1980 | Headley | 127/67 |
| 4,865,863 | 9/1989 | Drosise et al. | 426/518 |
| 4,938,986 | 7/1990 | Zürcher et al. | 426/624 |
| 5,020,732 | 6/1991 | Bahrani | 241/7 |
| 5,141,757 | 8/1992 | Ho Dac et al. | 276/46 |
| 5,269,470 | 12/1993 | Ishikawa et al. | 241/23 X |
| 5,385,746 | 1/1995 | De Almeida | 426/518 X |

FOREIGN PATENT DOCUMENTS

| | | |
|---|---|---|
| 01260285 | 10/1989 | Japan . |
| 1581859 | 12/1980 | United Kingdom . |
| WO9221623 | 12/1992 | WIPO . |

OTHER PUBLICATIONS

Derwent Abstract Accession No. 89–345989(47) of Tokai Seifunki Seis Japanese Patent Document No. JP–A–01 260285 (1989).

Septu Product Information Brochure, "Micronization—Septu Ultrafine", 4 pages Date Unknown.

*Primary Examiner*—Milton Cano

*Attorney, Agent, or Firm*—Vogt & O'Donnell, LLP

[57] ABSTRACT

Food product fibers containing moisture, particularly fiber residues obtained from extraction procedures or from a hydrolysis procedure, are milled, dehydrated and deodorized by projecting fiber residues towards a wall surface for attrition milling and simultaneously, propelling air heated to a temperature of from 200° C. to 400° C. towards the projected fiber residues so that the projected fiber residues are projected against the wall surface for obtaining attrited fiber and the heated air is propelled towards the projected fiber residues and attrited fiber for dehydrating and deodorizing the projected fiber residues and for entraining dehydrated, deodorized attrited fiber for collection. In a case of treating fiber residues resultant from hydrolysis of a plant substance, the dehydrated, deodorized attrited fiber is mixed with ingredients to obtain a mixture for preparing a bread-crumb product, and then, the mixture is extrusion-cooked.

20 Claims, 1 Drawing Sheet

13 11 3 2 1 4 5 10 12 14 9 8 7 6 15

PROCESS FOR MILLING, DEHYDRATING AND DEODORIZING PLANT FIBER RESIDUES

BACKGROUND OF THE INVENTION

The subject of the present invention is a process for production of a powdered food product, in which a fibrous and wet food product is milled and dried, and a use of a device for the production of such a powder.

Various processes and devices for the treatment or drying of residues from the pressing or centrifuging of aqueous products containing insoluble materials, in particular a high proportion of plant fibres, are known.

PCT Patent Application Publication No. WO 9221623 (Alb. Klein GmbH & Co KG) describes the pressing of water treatment plant sludges and the drying of the pressing residue in at least two successive dryers, namely a cone dryer and a segmented-disc dryer, for example.

Great Britain Complete Patent Specification No. 1,581, 859 (Grampex Protein Ltd) describes the continuous manufacture of fishmeal from ground fish flesh, in a device comprising a cylindrical body and an axial rotor equipped with blades which stir and convey the body of material, heating elements being provided in the form of coaxial rings spaced within and along the cylindrical body.

Japanese Patent Application Kokai JP-A-01-260285 (Tokai Seifunki Seis) describes a dryer for reducing soya or sake cake to powder, comprising a horizontal cylindrical body, an axial rotor equipped with sets of blades for conveying and for stirring in the shape of discs, and grids arranged between the sets of blades which have a mesh opening which is always smaller from the upstream towards the downstream end and adjust the residence time, in the device, of the material to be dried.

SUMMARY OF THE INVENTION

The aim of the present invention is to provide a process for the production of a powdered food product by milling and drying a fibrous and wet food product which is particularly effective and which additionally makes it possible to deodorize this product.

To this end, in the process according to the present invention, the said fibrous and wet food product is milled by attrition by projecting it against a hard surface and it is simultaneously dried with hot air.

To this end too, the present invention also comprises the use, for the production of a powdered food product by milling and drying a fibrous and wet food product, of a device for milling by attrition which is capable of projecting the said product against a hard surface while simultaneously drying it with hot air.

It has been observed with surprise that such a process and such a device make it possible effectively to prepare a powdered food product which is pleasant to the taste with great efficiency and a real saving in means and energy, in comparison with the known processes, from a fibrous and wet food product which may in particular require efficient deodorization.

DETAILED DESCRIPTION OF THE INVENTION

Figure 1:
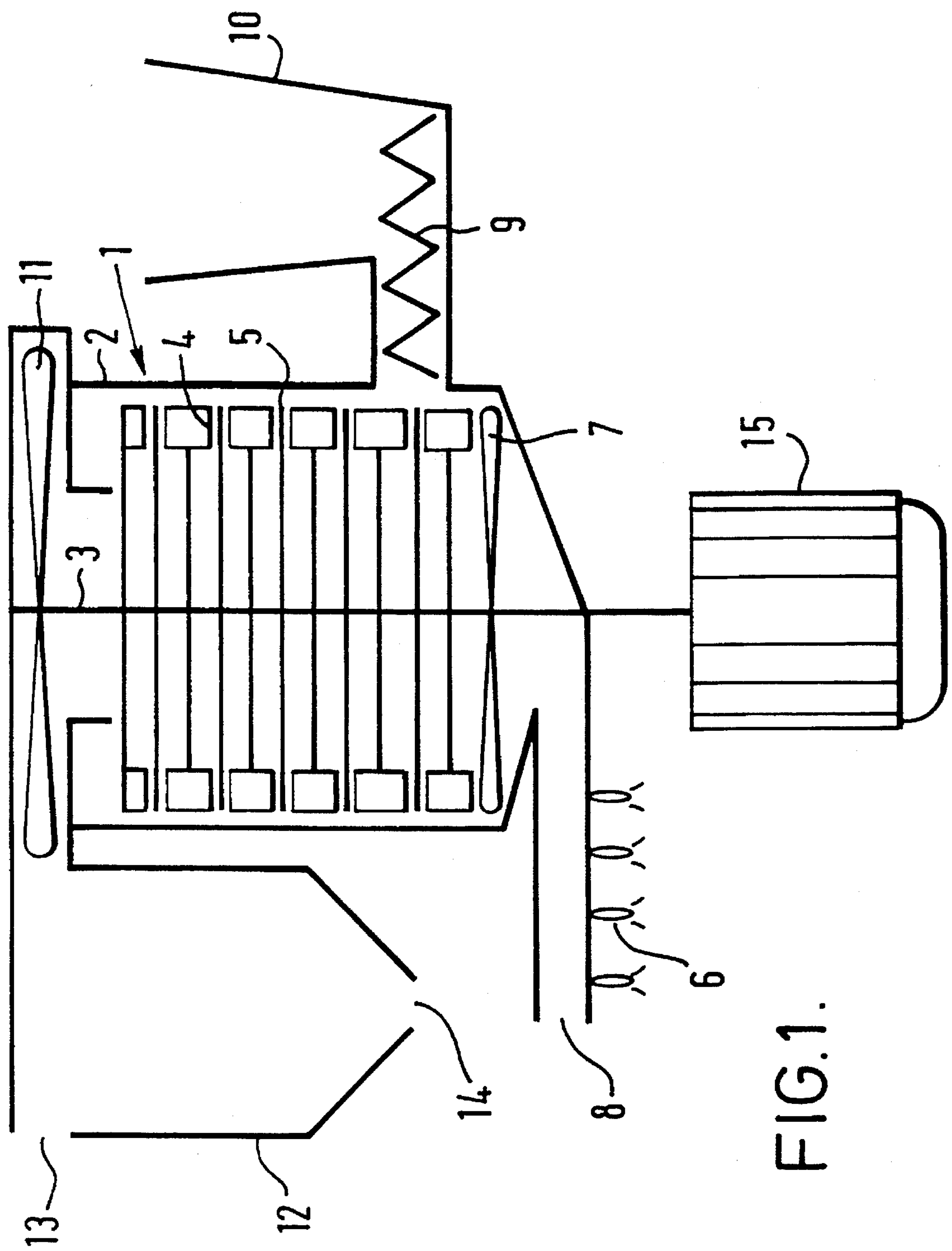

In order to implement the process according to the present invention, it is possible to start with a fibrous and wet starting material chosen from a group consisting of residues from the extraction of juice from fruit or vegetables, the residues from the extraction of sugar from beet, the residues from the pressing of aqueous suspensions of plant product hydrolysates, and coffee grounds, for example.

The expression "residue from the pressing of an aqueous suspension of a plant product hydrolysate" means, in the context of the present statement, a by-product from the manufacture of flavouring agents of the soy sauce type obtained when, in order to express the said sauce therefrom, the pressing is carried out of an aqueous suspension of a plant product which is rich in proteins such as soy, to which has preferably been added a product which is rich in carbohydrates such as cereals, in particular wheat, hydrolysed enzymatically and/or by fermentation, for example.

Such a starting product can have a water content of 20–40%, for example, this water being embedded in a jumble of plant fibres from which it is very difficult to extract it. By virtue of the present process, this water can nevertheless be separated from the fibres while simultaneously releasing and discharging an apparently large amount of volatile substances trapped in the jumble of plant fibres. This starting product can thus be milled and can be simultaneously dried to a residual water content of 3–12%, for example, while deodorizing it in an astonishingly effective way.

The said starting product can be milled by attrition by projecting it against a hard surface in the shape of a vertical cylindrical internal wall using an axial rotor comprising a shaft to which are attached projection components and the product can simultaneously be dried by causing a stream of hot air to move between the rotor and the wall, for example.

In particular, the said product can be introduced continuously between the said rotor and the said wall via the bottom, the milled and dried product can be continuously collected via the top and a stream of hot air can be made to move between the rotor and the wall from the bottom upwards, for example.

This hot air can have a temperature of 50°–400° C., for example. It preferably has a temperature of 200°–400° C. at the beginning of the drying and from 50° to less than 200° C. at the end of the drying.

The device which is used for the production of a powdered food product according to the present invention is therefore a device for milling by attrition which is capable of projecting the said product against a hard surface while simultaneously drying it with hot air.

This device preferably comprises a vertical cylindrical body having a hard surface in the shape of a vertical cylindrical internal wall, an axial rotor comprising a shaft to which are attached projection components, a device for heating air and propelling the hot air from the bottom upwards between the said wall and the said rotor, a device for feeding with starting product via the bottom and a device for discharging the milled product via the top.

The device used according to the present invention is described in more detail below with reference to the appended drawing.

BRIEF DESCRIPTION OF THE DRAWING FIGURE

The drawing FIGURE illustrates diagrammatic view in vertical section of an embodiment of the device used according to the present invention.

DETAILED DESCRIPTION OF THE DRAWING FIGURE

The embodiment of the device represented in the drawing comprises a vertical cylindrical body 1 having a hard surface in the shape of a vertical cylindrical internal wall 2, an axial rotor driven by a motor 15 and comprising a shaft 3 to which are attached projection components in the form of blades 4 and of discs 5, a device 6–8 for heating air and propelling the hot air from the bottom upwards between the said wall 2 and the said rotor 3, a device 9–10 for feeding with starting product via the bottom and a device 11–14 for discharging the milled product via the top.

The said device for heating and propelling air comprises an air intake 8, a perforated distribution pipe for heating with gas 6 and an extractor/propellant fan 7.

The said device for feeding with starting product comprises a hopper 10 and a feed screw 9.

The said device for discharging the milled product comprises an extractor/ejector fan 11 and a cyclone 12 having an air outlet 13 via the top and a powder outlet 14 via the bottom.

EXAMPLES

The process according to the present invention is described in more detail in the examples below where the percentages and parts are given by weight.

Example 1

Using a device such as that represented in the drawing, in this case a Septu mill of V-5 ultrafine type, a powdered food product is produced from a residue from the pressing of a flavouring agent prepared in a way similar to that described in Example 2 of U.S. Pat. No. 5,141,757, the contents of which are incorporated in the present statement by reference.

An aqueous suspension containing 20%, on a dry basis, of a degreased soya flour is thus prepared. This suspension is hydrolysed using an alkaline bacterial protease lasting 3 h at 68° C. at an initial pH of 10 which falls over 5–10 min to 7.5. The suspension is sterilized by injection of steam and is cooled to 30°–35° C. Koji, in the form of a mixture of cooked soya and of crushed roasted wheat fermented for 44 h with a culture of Aspergillus oryzae spores, is added at the rate of 20% of koji, with respect to the solids content of the suspension. Sodium chloride is also added to it, in an amount such that it has a sodium chloride content of 14%. The pH of the suspension is adjusted to 5.4 by addition of citric acid. The suspension is innoculated with 2% by volume of a mixed *Saccharomyces rouxii* and *Torulopsis etchelsii* culture. Maturation is allowed to take place at 33° C. for four weeks. The suspension is then pressed using a hydraulic press in order to express the juice therefrom.

The residue from this pressing has the following composition:

| | |
|---|---|
| water content | 32.0% |
| proteins | 30.6% |
| fats | 4.0% |
| fibers | 17.0% |
| carbohydrates | 5.6% |
| ash | 10.8% |

This residue is introduced continuously into the said device at the rate of 500 kg/h. The rotor rotates at 4850 revolutions/min. Air heated to 200° C. is propelled through the device. It emerges therefrom, entraining the residue reduced to a powder, at a temperature of approximately 120° C.

The powder thus produced has a residual water content of approximately 9% and a neutral and pleasant taste. It does not have any unpleasant odour. It can be used in the preparation of food products as an additive which is rich in proteins and high in dietary fibre.

Example 2

The procedure is the same as described in Example 1, with the exception of the fact that air heated to 400° C. is propelled through the device and that it emerges therefrom at a temperature of approximately 190° C.

The powder thus produced has a residual water content of approximately 7% and a neutral, pleasant and slightly toasted taste. It does not have any undesirable odour. It can be used in the preparation of food products as an additive which is rich in proteins and high in dietary fibre.

Example 3

The powder as obtained in Example 1 or 2 is used in a mixture to be treated by cooking/extrusion for the production of a product of breadcrumb type. The mixture has a water content of 12% and comprises, in % by weight of solids:

| | |
|---|---|
| wheat flour | 75.0% |
| sodium chloride | 2.0% |
| sugars | 6.0% |
| skimmed milk powder | 2.0% |
| powder from Ex. 1 or 2 | 15.0% |

This mixture is cooked/extruded in a twin-screw extruder at a temperature of 150°–180° C. at a pressure of 140–180 bar and the cooked/extruded product is milled.

The product of breadcrumb type thus obtained can be used as is, in particular without addition of another flavour-enhancing agent, for coating slices of meat and thus preparing escalopes of veal or of turkey coated with breadcrumbs, or for coating slices of fish to be grilled and conferring on them an aromatic note of asiatic type, for example.

Example 4

The process is the same as described in Example 3, with the exception of the fact that, in the composition of the said mixture to be treated by cooking/extrusion, the proportion of powder according to Example 1 or 2 is increased to 30% on a dry basis.

This cooked/extruded and ground mixture can be used as a spice in a soup in order to confer on it an aromatic note of asiatic type, or in bread as a flavour enhancer, for example.

We claim:

1. A process for dehydrating and deodorizing water-containing food product fibers selected from the group consisting of fiber residues resultant from extraction of juice from fruit and vegetable substances, fiber residues resultant from extraction of coffee and of sugar from beet and fiber residues resultant from hydrolysis of plant substances comprising: projecting the fiber residues in a direction towards a wall surface to obtain projected fiber residues for attrition milling; and simultaneously, propelling air heated to a temperature of from 200° C. to 400° C. towards the projected fiber residues so that (i) the projected fiber residues are projected against the wall surface for obtaining attrited fiber and (ii) the heated air is propelled towards the projected fiber residues and attrited fiber for dehydrating and deodorizing the projected fiber residues and for entraining dehydrated, deodorized attrited fiber for collection.

2. A process according to claim 1 wherein the fiber residues are fiber residues resultant from hydrolysis of a plant substance.

3. A process according to claim 1 wherein the fiber residues are fiber residues resultant from hydrolysis of soy.

4. A process according to claim 1 wherein the fiber residues are fiber residues resultant from hydrolysis of a cereal.

5. A process according to claim 1 wherein the fiber residues are fiber residues resultant from extraction of coffee.

6. A process according to claim 1 wherein the fiber residues are fiber residues obtained from extraction of sugar from beet.

7. A process according to claim 1 wherein the fiber residues have a water content of from 20% to 40%.

8. A process according to claim 1 wherein the heated air is propelled upward.

9. A process according to claim 8 wherein the wall surface extends vertically.

10. A process according to claim 1 wherein the fiber residues are projected in a continuing flow and the heated air is propelled in a continuing flow.

11. A process according to claim 1 wherein the wall surface is a cylindrical wall surface and the fiber residues are projected by a rotating rotor having projecting members and the cylindrical wall surface is displaced a distance from the projecting members and wherein the heated air is propelled to pass between the rotating projecting members and the cylindrical wall surface.

12. A process according to claim 11 further comprising separating the entrained dehydrated, deodorized attrited fiber from the heated air with a cyclone.

13. A process according to claim 11 further comprising extracting the entrained dehydrated, deodorized attrited fiber and heated air contained by the cylindrical wall surface with a fan.

14. A process according to claim 13 further comprising separating the entrained dehydrated, deodorized attrited fiber from the heated air with a cyclone.

15. A process for preparing a food product comprising:

projecting water-containing fiber residues resultant from hydrolysis of a plant substance in a direction towards a wall surface to obtain projected fiber residues for attrition milling and simultaneously, propelling air heated to a temperature of from 200° C. to 400° C. towards the projected fiber residues so that (i) the projected fiber residues are projected against the wall surface for obtaining attrited fiber and (ii) the heated air is propelled towards the projected fiber residues and attrited fiber for dehydrating and deodorizing the projected fiber residues and for entraining dehydrated, deodorized attrited fiber for collection;

collecting the dehydrated, deodorized attrited fiber;

mixing the dehydrated, deodorized attrited fiber with ingredients to obtain a mixture for preparing a bread-crumb product; and extrusion-cooking the mixture to obtain a cooked-extruded product.

16. A process according to claim 15 wherein the mixture is extrusion-cooked at a temperature of from 150° C. to 180° C. under a pressure of from 140 bar to 180 bar.

17. A process according to claim 15 wherein the fiber residues are fiber residues resultant from hydrolysis of soy.

18. A process according to claim 15 wherein the fiber residues are fiber residues resultant from hydrolysis of a cereal.

19. A process according to claim 15 wherein the fiber residues have a water content of from 20% to 40%.

20. A process according to claim 15 wherein the wall surface extends vertically and the heated air is propelled up-ward.

* * * * *